Jan. 13, 1959   R. H. D. CHAMBERLIN   2,868,040
RESILIENT ORBIT GEAR AND MOUNTING THEREFOR
Filed Feb. 21, 1956   3 Sheets-Sheet 1

Inventor
REGINALD H.D. CHAMBERLIN
By
Watson, Cole, Grindle & Watson
Attorneys

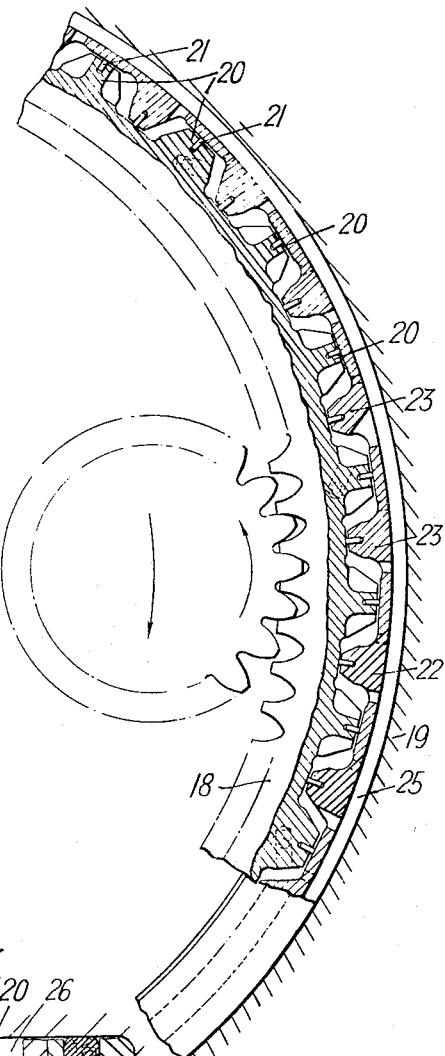
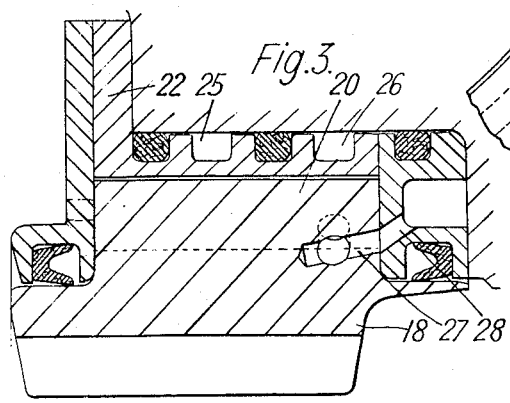

Jan. 13, 1959  R. H. D. CHAMBERLIN  2,868,040
RESILIENT ORBIT GEAR AND MOUNTING THEREFOR
Filed Feb. 21, 1956  3 Sheets-Sheet 3
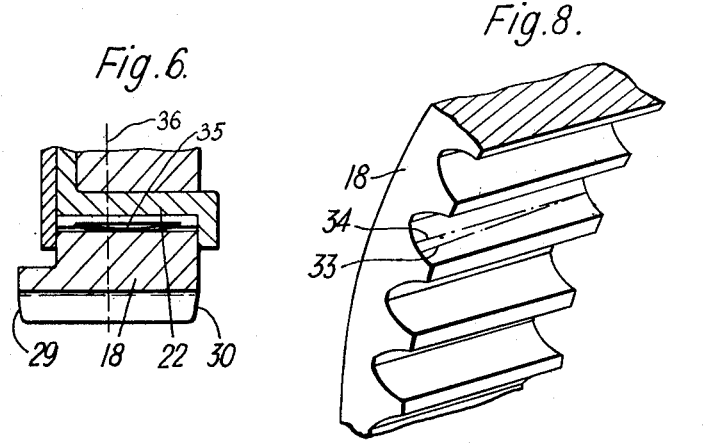
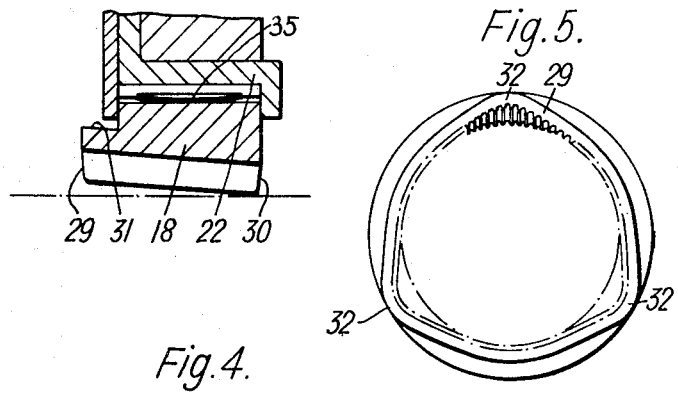
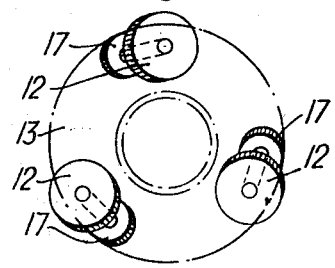
Inventor
REGINALD H.D. CHAMBERLIN
By
Watson, Cole, Grindle & Watson
Attorneys United States Patent Office 2,868,040
Patented Jan. 13, 1959

2,868,040

RESILIENT ORBIT GEAR AND MOUNTING THEREFOR

Reginald Henry Douglas Chamberlin, Ealing, London, England, assignor to D. Napier & Son Limited, London, England, a company of Great Britain Application February 21, 1956, Serial No. 566,985

Claims priority, application Great Britain March 8, 1955

5 Claims. (Cl. 74—801)

This invention relates to problems which arise from misalignment of the teeth of co-operating gears, and in particular with misalignment of teeth of a relatively small diameter pinion meshing with an internally toothed annulus gear. It is known that tooth misalignment tends to concentrate the tooth loading at one point on each tooth, and attempts have been made to compensate for such misalignment by forming the teeth at such an inclination as to provide contact over the full width of the teeth. The degree of misalignment however will tend to vary with variations in the applied load, and this system can therefore only be effective at one value of the load.

In cases where a pinion meshes with an internally toothed annulus gear, and where the deflection of the teeth of the pinion (whether due to deflection of the axis of the pinion, or helical distortion of the pinion teeth) is in a tangential direction, relative to the teeth of the annulus gear, it is clearly impossible however to correct for the misalignment by any method which involves distortion of the annulus gear teeth in a tangential direction.

It is an object of the invention therefore to provide automatic compensation for varying degrees of misalignment between the teeth of a pinion and an internally toothed annulus gear when the relative deflection is in a tangential direction, and according to the present invention in transmission gearing of this kind an annulus gear is so constructed and arranged as to distort under load so that the teeth of the gear which at any moment are in mesh with the teeth of the pinion become inclined radially outwards at a small angle to the central axis of the gear, so as to compensate for any misalignment of the teeth of the pinion over a wide range of applied loads.

The invention thus makes use of the inherent nature of the flanks of the teeth of the annulus gear, which are in all practical constructions of an involute nature and in any case inclined to planes containing the axis of the gear. The outward deflection of the teeth of the annulus gear therefore results in an effective tangential displacement of the point or line of contact between the opposite ends of the meshing teeth of the pinion and the annulus gear.

According to a preferred feature of the invention the annulus gear is substantially fully floating in a radial direction, and may be resiliently supported around its periphery. Thus in a preferred construction where the annulus gear constitutes the reaction member of a differential gear transmission and is thus held against rotation, it is formed with a number of radial webs lying in an annular hydraulic chamber surrounding the gear, the chamber being provided with fixed radial webs interposed between the webs on the gear, and means are provided for supplying hydraulic fluid under pressure to the series of hydraulic pressure chambers defined by the webs so as to locate the gear in a manner permitting the necessary distortion.

The webs are each preferably provided with resilient vanes at their extremities.

The distortion of the gear itself is likely to be highly complex, particularly where several pinions mesh simultaneously with the same annulus gear. In fact the distortion will not be truly conical, since this will involve considerable stretching of one end of the gear, and according to a further preferred feature of the invention the distortion is provided by a change of shape of one end of the gear relative to the other end. Thus for example where three pinions mesh with the same annulus gear, one end of the gear will tend to triangulate under the outward radial components of the forces exerted on the annulus gear by the pinions, and if this end of the gear is relatively flexible compared with the other end, the teeth of the gear adjacent the corners of the triangle will adopt the required outward radial inclination, even though the teeth adjacent the centres of the sides of the triangle may not be correctly inclined.

According to another feature of the invention therefore, to enable the relative change of shape between the opposite ends of the annular gear to be controlled, the effective centre of gravity of the cross section of the annulus gear is displaced axially from a plane normal to the axis and passing through the mid-points in the lengths of the teeth of the gear, measured in an axial direction. Thus in a preferred construction the annulus gear is cut away at one end of its outer periphery to form an annular groove or step adjacent one end of the gear.

The invention is particularly applicable to the invention described and claimed in British Patent No. 733,800. The earlier invention comprises epicyclic reduction gearing including means for compensating for helical distortion of the small diameter sun pinion, by permitting the axis of the planet shafts to displace under load so as to tilt the axis of each planet pinion which meshes with the sun pinion to an extent which varies with the value of the transmitted load, so as to maintain the alignment of the teeth. Particularly where such epicyclic reduction gearing includes double-pinion planet assemblies, in order to obtain an increased gear ratio, with the smaller diameter planet pinion meshing with an internally toothed annulus gear constituting a reaction member, it will be seen that the displacement of the shaft of the planet assembly would result also in varying degrees of misalignment between the teeth of this smaller diameter planet pinion and the meshing teeth of the annulus gear. By allowing the annulus gear itself to distort in accordance with the present invention this misalignment can be corrected.

The invention may be performed in various different ways but one specific embodiment will now be described by way of example with reference to the accompanying drawings in which;

Figure 2 is a sectional end view of the gearing showing one of the smaller diameter planet pinions meshing with the annulus gear, and the hydraulic chambers surrounding this gear.

Figure 3 is a sectional side elevation on an enlarged scale through the annulus gear and its support.

Figure 4 is a diagrammatic end view showing how the planet axes tilt in a tangential direction under load, the deflection being exaggerated for the sake of clarity.

Figure 5 is a simplified diagrammatic end view of the gearing showing the distortion of the gear under load, this distortion being again exaggerated for convenience.

Figures 6 and 7 are simplified sectional side elevations through the annulus gear showing the position of the gear teeth under no-load and full-load conditions respectively the deflection being again exaggerated, and Figure 8 is a perspective view of a segment of the annulus gear illustrating how the point of contact is displaced.

Figure 1:
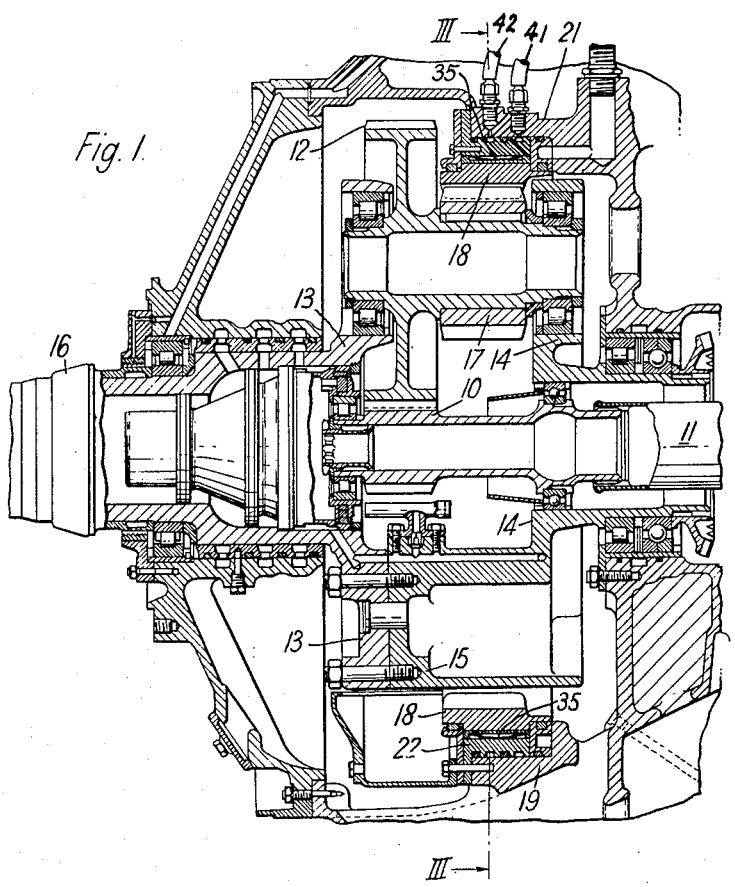
Figure 1 is a sectional side elevation through epicyclic reduction gearing including a floating annulus gear according to the invention.

The gear illustrated in Figure 1 includes as its main element a sun pinion 10 mounted on an input shaft 11 and meshing with a series of large diameter planet pinions 12 formed integral with planet shafts. Each planet shaft is supported at opposite ends in bearings carried by a spider comprising two spaced plates 13 and 14 interconnected by elastic pillars 15 spaced between the planet assemblies. The forward plate of the spider is connected to an output shaft 16. A relatively small diameter pinion 17 is mounted on the rear end of each planet shaft to rotate therewith and each of these pinions is arranged to mesh with an internally toothed annulus gear ring 18.

The gear ring 18 is supported from the gear casing 19 in a fully floating manner by means of a series of hydraulic pockets surrounding the gear. These pockets are formed by radial webs 20 projecting outwards from the annulus gear 18 and having spring pressed blades 21 at their extremities contacting the inner surface of a member 22 surrounding the gear. Circumferentially spaced between these radial webs 20 are a series of fixed radial webs 23 secured to the member 22, these webs 23 also being provided with spring pressed blades 24 at their inner ends to engage the outer surface of the gear 18. The two series of alternate hydraulic pockets so formed are arranged to be connected selectively to a source of hydraulic pressure and to relief, by means of conduits 41, 42 communicating with annular grooves 25, 26 in the member 22. The flow of fluid to, and the pressure in, the pockets, is controlled automatically by valve ports 27, 28. The exact arrangement is described in detail in United States Patent No. 2,715,834. The pressure in the pockets is such as to prevent the annulus gear rotating and to provide the necessary reaction against the torque transmitted to the annulus gear, when power is transmitted through the complete reduction gear assembly.

Referring now to Figure 4 it will be seen that when the spider 13, 14 is rotating under load the reaction on the teeth of the planet pinions 12 and 17 will tend to cause the axes of the planet shafts to deflect in a tangential direction, as shown on an exaggerated scale, the degree of deflection varying with the load transmitted by the gearing. At the same time the planet pinions 17 will exert forces on the annulus gear having substantial outward radial components. These outward forces on the gear will tend to cause it to distort into a roughly triangular shape, as shown in Figure 5 there being three planet assemblies but due to the construction of the gear and its method of mounting from the gear casing 19, the forward end 29 of the gear will be more readily distortable than the rear end 30, and in the sectional view shown in Figure 3 the forward end will tend to adopt the shape shown in Figure 5 while the rear end 30 will remain more truly circular. This may be achieved in a number of ways but in the preferred construction shown the effective position at which the gear is supported, that is the central point of the bowed springs 35, illustrated in Figures 6 and 7, is displaced axially from a plane normal to the axis of the gear and passing through the mid-points in the lengths of the teeth of the gear, measured axially. This plane is indicated at 36 in Figure 6. Furthermore, the annulus gear 18 is cut away at 31 adjacent its forward end 29, to form an annular groove or step and the reduction in the cross section of the gear at this forward end 29, which projects somewhat to one side of the supporting element 22 shifts the effective center of gravity of the cross section of the gear axially away from the plane 36, and permits the forward end to distort more readily.

It will be seen therefore that due to the different degrees to which the forward and rear ends of the annulus gear can distort, the teeth adjacent the corners 32 of the triangle, where the planet pinions 17 mesh with the gear, will be no longer parallel to the axis of the gear as shown in Figure 6 but will tend to become inclined thereto with their forward ends 29 displaced outwards, as shown in Figure 7. The distortion of the teeth of the gear will it is believed be non-linear, that is to say they will adopt a curved profile in side elevation, but this curvature is likely to be extremely slight and for all practical purposes the teeth of the annulus gear which are in mesh with the teeth of the pinions 17 may be considered as lying on an imaginary cone.

Referring now to Figure 8 which is a fragmentary perspective view of part of the annulus gear meshing with one of the planet pinions, it will be seen that this "conical" distortion of the teeth of the annulus gear will result in substantially full line contact between the teeth of the gear and the teeth of the meshing pinion across the full width of the teeth. The contact line will however be inclined somewhat as shown at 33, as opposed to the normal contact line 34 parallel to the axis of the gear, when no power is being transmitted through the gearing. By suitable design of the annulus gear it is possible to arrange for its distortion to vary in such a manner that the meshing teeth of the gear and the pinions 17 are maintained substantially in contact over the full width of the teeth over a wide range of applied loads.

The invention provides tooth alignment between the meshing pinions and the annulus gear for large variations in transmitted load and thus enables the maximum permitted power transmission of the complete gear system to be raised far beyond the value which would otherwise cause tooth failure.

What I claim as my invention and desire to secure by Letters Patent is:

1. Transmission gearing comprising a pinion meshing with an internally toothed annulus gear, a mounting ring assembly surrounding and supporting the annulus gear, the ring assembly making effective contact with the annulus gear over an area which is limited in width in an axial direction to substantially less than the width of the teeth of the gear in an axial direction, so that individual parts of the gear on opposite sides of the plane passing through the effective center line of support are capable of deflection in a radial direction, the said plane being displaced axially from a plane normal to the axis and passing through the mid points in the lengths of the teeth of the gear measured axially, so that the teeth of the gear which at any moment are in mesh with the teeth of the pinion become inclined radially outwards at a small angle to the central axis of the gear, so as to compensate for any misalignment of the teeth of the pinion over a wide range of applied loads.

2. Transmission gearing as claimed in claim 1 in which the mounting ring assembly includes a rigid outer ring and a series of circumferentially spaced resilient supports acting in a radial direction between the outer ring and the annulus gear.

3. Transmission gearing as claimed in claim 1 in which the annulus gear constitutes the reaction member of a differential gear system, and is held against rotation, and is formed with a number of radial webs lying in an annular hydraulic chamber in the mounting ring assembly surrounding the gear, and including a series of fixed radial webs mounted on the mounting ring assembly interposed between the webs on the gear, both series of webs having resilient vanes at their extremities for supplying hydraulic fluid under pressure to the series of hydraulic pressure chambers defined by the webs so as to locate the gear in a manner permitting the necesary distortion.

4. Transmission gearing as claimed in claim 1 in which the effective centre of gravity of the cross section of the annulus gear is displaced axially from a plane normal to the axis and passing through the mid-points in the lengths of the teeth of the gear, measured in an axial direction.

5. Transmission gearing as claimed in claim 4, in which the annulus gear is cut away at one end of its outer periphery to form an annular unsupported step adjacent one end of the gear.

References Cited in the file of this patent

UNITED STATES PATENTS

| | | |
|---|---|---|
| 618,272 | Johnson | Jan. 24, 1899 |
| 2,591,734 | Smith et al. | Apr. 8, 1952 |
| 2,715,834 | Chamberlin | Aug. 23, 1955 |

FOREIGN PATENTS

| | | |
|---|---|---|
| 890,697 | France | Nov. 8, 1943 |